US012592114B2

United States Patent
(12) United States Patent
Chung et al.

(10) Patent No.: US 12,592,114 B2
(45) Date of Patent: Mar. 31, 2026

(54) AUTOMATED SORTATION AND DISPENSING SYSTEM

(71) Applicant: Animae Technologies Limited, Hong Kong (CN)

(72) Inventors: Wai Lung David Chung, Hong Kong (CN); Hiu Kwan Lam, Hong Kong (CN)

(73) Assignee: Animae Technologies Limited, Hong Kong (HK)

(*) Notice: Subject to any disclaimer, the term of this patent is extended or adjusted under 35 U.S.C. 154(b) by 236 days.

(21) Appl. No.: 18/684,190

(22) PCT Filed: Sep. 1, 2022

(86) PCT No.: PCT/CN2022/116647
§ 371 (c)(1),
(2) Date: Feb. 16, 2024

(87) PCT Pub. No.: WO2023/030469
PCT Pub. Date: Mar. 9, 2023

(65) Prior Publication Data

US 2024/0362967 A1 Oct. 31, 2024

Related U.S. Application Data

(60) Provisional application No. 63/240,361, filed on Sep. 2, 2021.

(51) Int. Cl.
*G07F 11/24* (2006.01)
*G07F 11/00* (2006.01)
(Continued)

(52) U.S. Cl.
CPC ............ *G07F 11/24* (2013.01); *G07F 11/005* (2013.01); *G07F 11/163* (2020.05); *G07F 11/44* (2013.01)

(58) Field of Classification Search
CPC ...... G07F 11/00; G07F 11/005; G07F 11/163; G07F 11/24; G07F 11/44; G07F 17/32
(Continued)

(56) References Cited

U.S. PATENT DOCUMENTS 3,815,781 A * 6/1974 Armstrong ............ B65G 33/04 221/75
4,429,807 A * 2/1984 Enders .................... G07F 11/42 221/75

(Continued)

FOREIGN PATENT DOCUMENTS

JP H0916832 A * 1/1997
JP 6158407 B1 * 7/2017
WO WO-9708977 A1 * 3/1997 ............... A47F 1/03

*Primary Examiner* — Leslie A Nicholson, III

(57) ABSTRACT

An automated sortation and dispensing system (1000) includes a frame (100) defining a cavity (101) in which objects (109) are stacked, a lever axis defined by a transverse rod (104) fixed in the frame, a drive unit (103) pivotally coupled to the transverse rod, a sorter (102) extending upward from and rotatably driven by the drive unit and including upper and lower helical slots (1022, 1025) for carrying the objects, and a shock absorber (105) engageable with an upper end of the sorter. When the drive unit is activated, the drive unit drives the sorter to spin. If a force is exerted on the sorter by the objects, the drive unit pivots downward, and the sorter tilts sideways to absorb the force and moves back by a rebound force of the shock absorber when the force is released.

20 Claims, 4 Drawing Sheets

(51) Int. Cl.
*G07F 11/16* (2006.01)
*G07F 11/44* (2006.01)

(58) Field of Classification Search
USPC .......................................................... 221/181
See application file for complete search history.

(56) References Cited

U.S. PATENT DOCUMENTS

| | | | | | |
|---|---|---|---|---|---|
| 5,176,288 | A * | 1/1993 | Craven | .............. | B65G 47/8853 221/124 |
| 5,395,146 | A * | 3/1995 | Liu | ...................... | A63B 47/002 221/199 |
| 5,542,570 | A * | 8/1996 | Nottingham | ............ | G07F 11/44 221/277 |
| 6,631,828 | B1 * | 10/2003 | Reardon | ............ | A63B 57/0037 221/268 |
| 2006/0231566 | A1 * | 10/2006 | Indig | ....................... | G07F 11/44 221/266 |

* cited by examiner

AUTOMATED SORTATION AND DISPENSING SYSTEM

CROSS-REFERENCE TO RELATED APPLICATIONS

This application claims the benefit of U.S. Provisional Patent Application No. 63/240,361 filed on Sep. 2, 2021, the entire content of which is hereby incorporated by reference in its entirety.

TECHNICAL FIELD

The present application relates to a sortation and dispensing system, in particular an automated sortation and dispensing system for stacked objects.

BACKGROUND

Dispensing devices are widely utilized in dispensing a wide range of objects of different shapes and sizes. Dispensing devices may include but are not limited to vending machines, food dispensers, and toy capsule machines. These dispensing devices also act as a storage area for stacking objects to maximize the amount of storage space utilized. However, the stacked objects may get jammed or have not fully dropped to the collection tray. Furthermore, the objects at the upper part may apply forces to the objects at the lower part, causing the objects at the lower part to collapse and cannot be dispensed.

Automated sortation systems are commonly used in modern manufacturing environments and warehouses for sorting objects and diverting objects to specific destinations. Automated sortation systems can help to reduce errors and increase efficiency.

SUMMARY

It is, therefore, an object of the present disclosure to provide an automated sortation and dispensing system for stacked objects.

Other objects and advantages will become apparent when taken into consideration with the following specification and drawings.

It is also an object of the present disclosure to overcome or ameliorate at least one of the disadvantages of the prior art, or to provide a useful alternative.

In accordance with the present disclosure, there is provided an automated sortation and dispensing system for stacked objects. The automated sortation and dispensing system may include a frame having a top wall, a bottom wall, and sidewalls that collectively define a cavity in which objects are stacked; a lever axis defined by a transverse rod which is attached to the frame in a lower portion of the cavity; a drive unit having one end pivotally coupled to the transverse rod, and acting as a lever arm; a sorter including a shaft extending upward from another end of the drive unit to an upper portion of the cavity, an upper helical slot extending along an upper portion and a middle portion of the shaft and defined by one of a left-hand screw and a right-hand screw, and a lower helical slot extending along a lower portion of the shaft and defined by another one of the left-hand screw and the right-hand screw, a lower end of the sorter rotatably coupled to and driven by the drive unit; and a shock absorber being fixed to the frame at the upper portion of the cavity, an upper end of the sorter being engageable with the shock absorber. When the drive unit is activated, the drive unit drives the sorter to spin clockwise or anticlockwise about its axis and generate multidirectional forces to rearrange the objects, and at the same time carry the objects down to the lower portion of the sorter under gravity, the drive unit is stopped after a bottommost one of the objects is dispensed. If a lateral force is exerted on the sorter by the objects, the drive unit pivots downward about the lever axis, and the sorter tilts sideways to absorb the lateral force by means of the shock absorber and returns to its original position by a rebound force of the shock absorber after the lateral force is released.

In one embodiment, the frame includes a first sliding member slanting downward from another one of the sidewalls to the lower portion of the sorter to facilitate rolling or sliding of the objects towards the lower portion of the sorter.

In one embodiment, a divider is connected to a lower end of the first sliding member, and located proximate to the lower portion of the sorter in such a position that the divider allows one of the objects to pass through.

In one embodiment, the frame further includes a second sliding member disposed below the first sliding member, and slanting downward from the lower portion of the sorter to a pick-up port provided on the sidewalls.

In one embodiment, the system further includes one or more sensor modules mounted on the frame proximate to the pick-up port and in the vicinity of or on the second sliding member for detecting the bottommost one of the objects that passes through the second sliding member.

In one embodiment, the multidirectional forces include upward forces that push away the objects in the upper portion of the cavity to release pressure exerting on the objects in the lower portion of the cavity, and downward forces that make the objects fit into the lower helical slot.

In one embodiment, the shock absorber is attached on an inner surface of the one of the sidewalls.

In one embodiment, the lower end of the sorter is rotatably coupled to and driven by the drive unit through an output shaft.

In one embodiment, an upper end of the output shaft is connected coaxially to the lower end of the sorter, and a lower end of the output shaft is rotatably coupled to and driven by the drive unit.

In one embodiment, the sorter combines with the drive unit, the transverse rod, the output shaft, and the shock absorber to form a suspension damper system to absorb lateral force and reset position of the sorter.

In one embodiment, the one of the sidewalls is located at a rear side of the frame. In one embodiment, the pick-up port is provided on one of the sidewalls located at a front side of the frame to facilitate picking up of the objects.

In one embodiment, the one or more sensor modules include one or more sensors selected from a group consisting of an infrared sensor, an ultrasonic sensor, a proximity sensor, a computer vision sensor, an optical sensor, a weight sensor, and a limit switch sensor.

In one embodiment, the objects have a shape selected from a group consisting of a circular shape, a toy capsule shape, a box shape, a cylindrical shape, and an irregular shape.

In one embodiment, the drive unit includes a motor that drives the sorter to spin clockwise or anticlockwise about its axis.

In one embodiment, the sorter is in the form of a vertical screw conveyor.

In one embodiment, the shock absorber includes a housing having a bottom wall formed with a slot, the upper end of the sorter being inserted into the housing through the slot;

at least one slide rod fixed within the housing; a sliding block slidable along the at least one slide rod; and an elastic component mounted at one end of the at least one slide rod which is extending towards the one of the sidewalls, and exerting a biasing force to urge the sliding block to another end of the at least one slide rod which is extending away from the one of the sidewalls. If lateral force is exerted on the sorter by the objects, the sorter tilts sideways towards the one of the sidewalls, the upper end of the sorter moves along the slot and pushes the sliding block against the biasing force of the elastic component, thereby absorbing the lateral force of the objects. After the lateral force of the objects is released, the elastic component rebounds and pushes the sliding block back, and the tilted sorter returns to its original position.

In one embodiment, the elastic component is a coil spring wound around the or each of the at least one slide rod.

In one embodiment, the upper helical slot extending along the upper and middle portions of the shaft is defined by a left-hand screw, the lower helical slot extending along the lower portion of the shaft is defined by a right-hand screw, and the drive unit drives the sorter to spin anticlockwise about its axis.

The action of "spinning" and the force of gravity rearrange the stacked objects in the central cavity; hence, releasing the pressure applied to the stacked objects to preventing jamming.

The weight of the objects may press the sorter towards the rear wall. The sorter combines with the drive unit, the lever arm, the output shaft, and the shock absorber to form a suspension damper system to reduce jolting and reset the position of the sorter. Without the suspension damper system, the sorter may stop spinning when too much weight of the stacked objects is exerting on the sorter.

BRIEF DESCRIPTION OF THE DRAWINGS

Embodiments of the present disclosure will now be described, by way of example, with reference to the accompanying drawings in which.

DETAILED DESCRIPTION

It should be noted that throughout the specification and claims herein, when one element is said to be "coupled" or "connected" to another, this does not necessarily mean that one element is fastened, secured, or otherwise attached to another element. Instead, the term "coupled" or "connected" means that one element is either connected directly or indirectly to another element or is in mechanical or electrical communication with another element.

Figure 1:
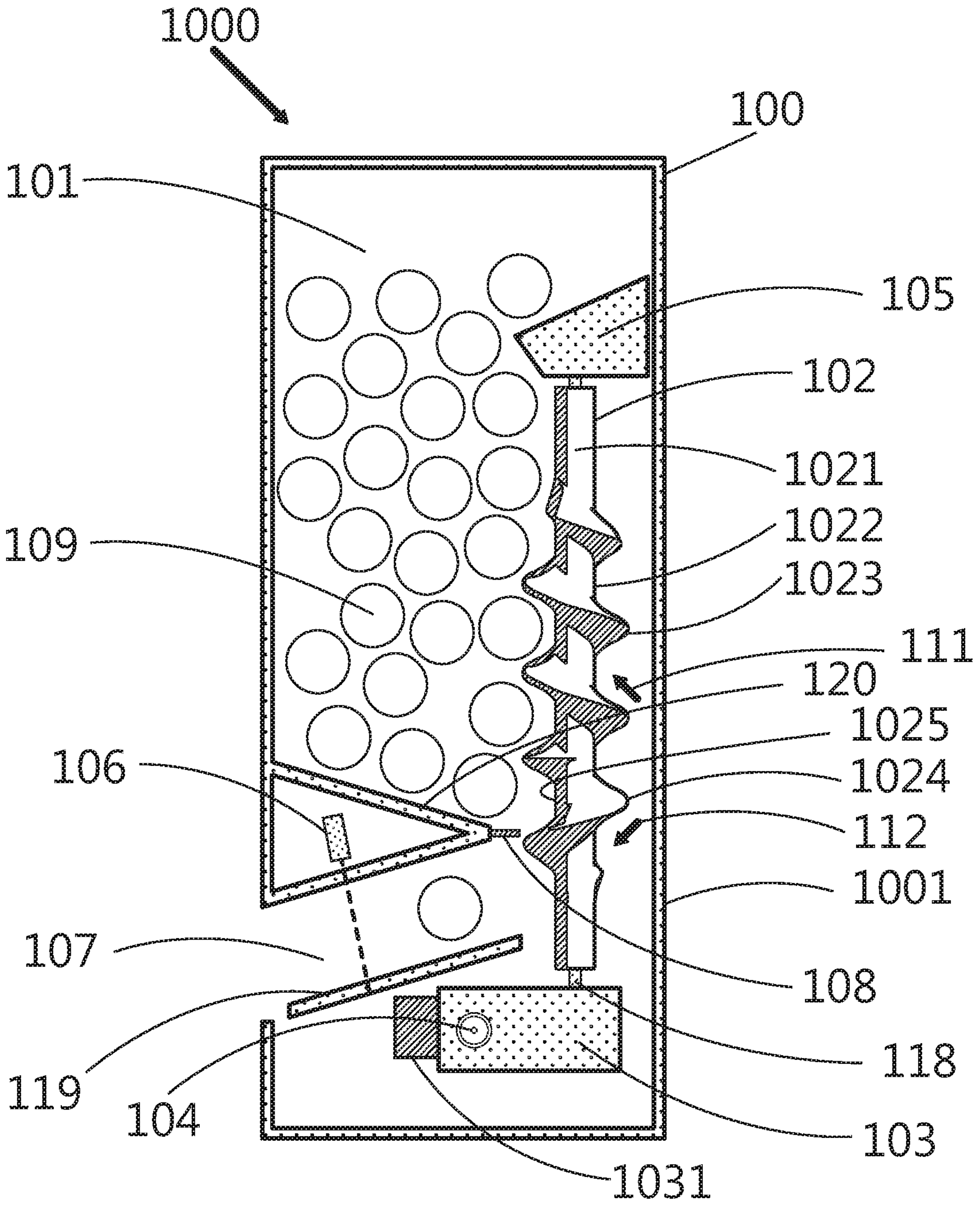
FIG. 1 is a side elevational view of an automated sortation and dispensing system according to one embodiment of the present disclosure.

The present disclosure relates to an automated sortation and dispensing system for stacked objects. With reference to FIG. 1, there is shown an embodiment of an automated sortation and dispensing system 1000 for dispensing objects 109. In this embodiment, the automated sortation and dispensing system 1000 includes a frame 100 having a top wall, a bottom wall, and sidewalls 1001 that collectively define a central cavity 101 in which the objects 109 are held and stacked.

The system 1000 may include a sorter 102, a drive unit 103, a lever axis defined by a transverse rod 104, a shock absorber 105, a sensor module 106, a pick-up port 107, a divider 108, a first sliding member 120, and a second sliding member 119.

The transverse rod 104 may be attached to the frame 100 in a lower portion of the cavity 101, and defining a lever axis. The drive unit 103 has one end pivotally coupled to the transverse rod 104, and serves as a lever arm.

The sorter 102 may include a shaft 1021 extending upward from another end of the drive unit 103 to an upper portion of the cavity 101, an upper helical slot 1022 extending along an upper portion and a middle portion of the shaft 1021 and defined by one of a left-hand screw 1023 and a right-hand screw 1024, and a lower helical slot 1025 extending along a lower portion of the shaft 1021 and defined by the other one of the left-hand screw 1023 and the right-hand screw 1024. The upper and lower helical slots 1022, 1025 are sized and shaped to receive and carry the objects 109.

Figure 2:
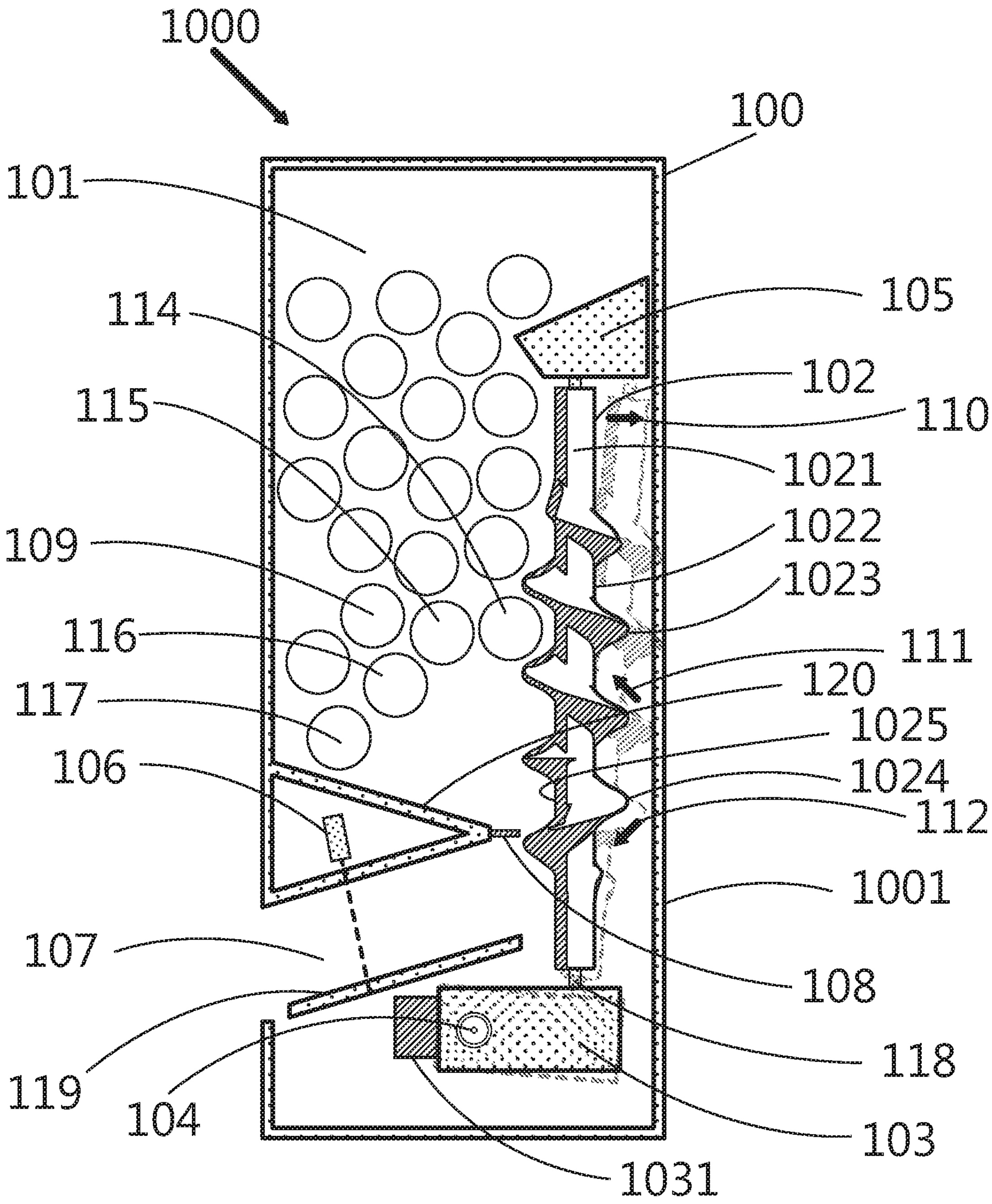
FIG. 2 is a side elevational view of the automated sortation and dispensing system of FIG. 1, showing objects at the lower part form an arc and cause jamming, and tilting of the sorter according to one embodiment of the present disclosure.

According to the embodiment illustrated in FIGS. 1 and 2, the upper helical slot 1022 extending along the upper and middle portions of the shaft 1021 is defined by the left-hand screw 1023, and the lower helical slot 1025 extending along the lower portion of the shaft 1021 is defined by the right-hand screw 1024. When the drive unit 103 drives the sorter 102 to spin anticlockwise about its axis, the spinning sorter 102 generates upward forces 111 that push away the objects 109 in the upper and middle portions of the cavity 101 and downward forces 112 that make the objects 109 in the lower portion of the cavity 101 fit into the lower helical slot 1025.

In one embodiment, the sorter 102 may be disposed proximate to and spaced apart from an inner surface of one of the sidewalls 1001. In the illustrated embodiment, the sorter 102 is mounted proximate to and spaced apart from an inner surface of a sidewall located at a rear side of the frame 100. In the illustrated embodiment, the sorter 102 may be in the form of a vertical screw conveyor.

A lower end of the sorter 102 may be rotatably coupled to and driven by the drive unit 103. An upper end of the sorter 102 may be slidable in a slot 123 provided in the shock absorber 105.

The shock absorber 105 may be fixed to the frame 100 in the upper portion of the cavity 101. In the illustrated embodiment, the shock absorber 105 is attached on an inner surface of a sidewall located at a rear side of the frame 100. The upper end of the sorter 102 may be engageable with the shock absorber 105.

Figure 3:
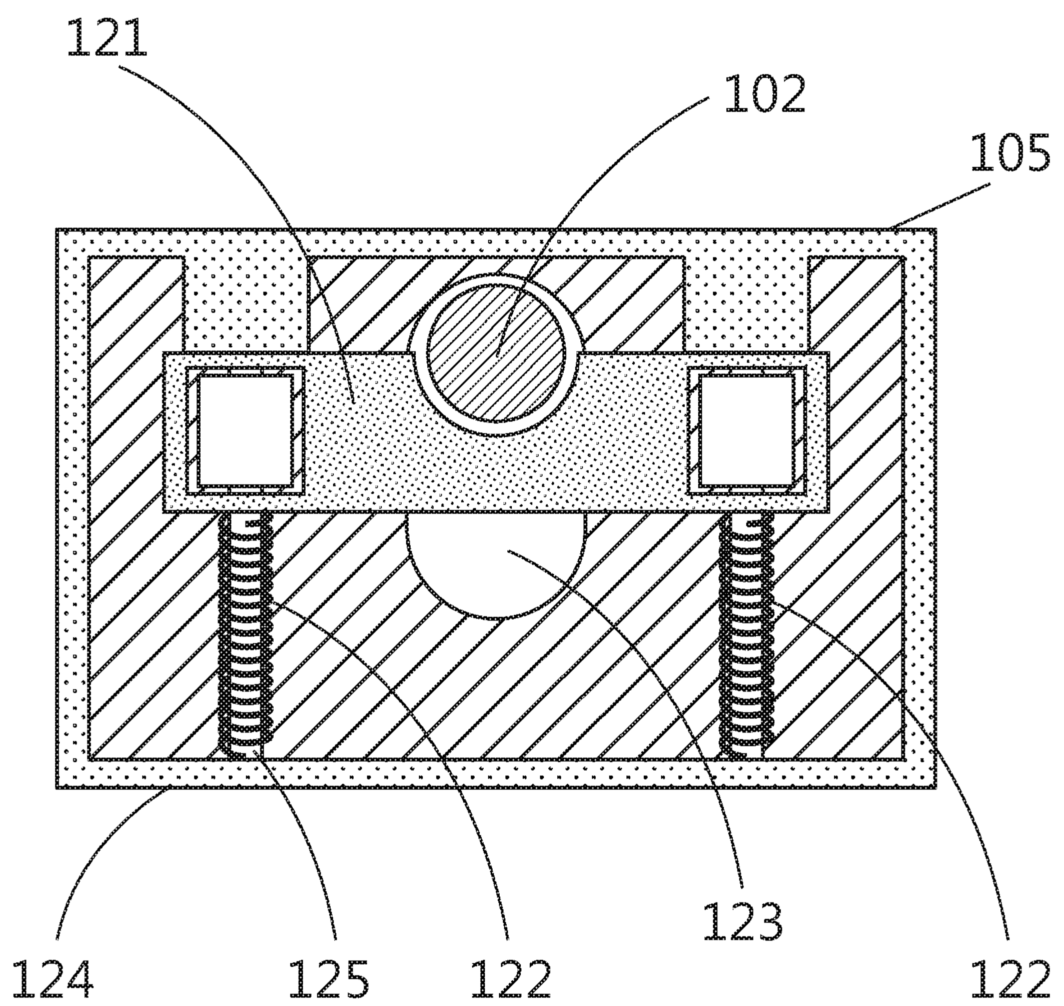
FIG. 3 is a sectional top view of a shock absorber with an elastic component in a normal state according to one embodiment of the present disclosure.
Figure 4:
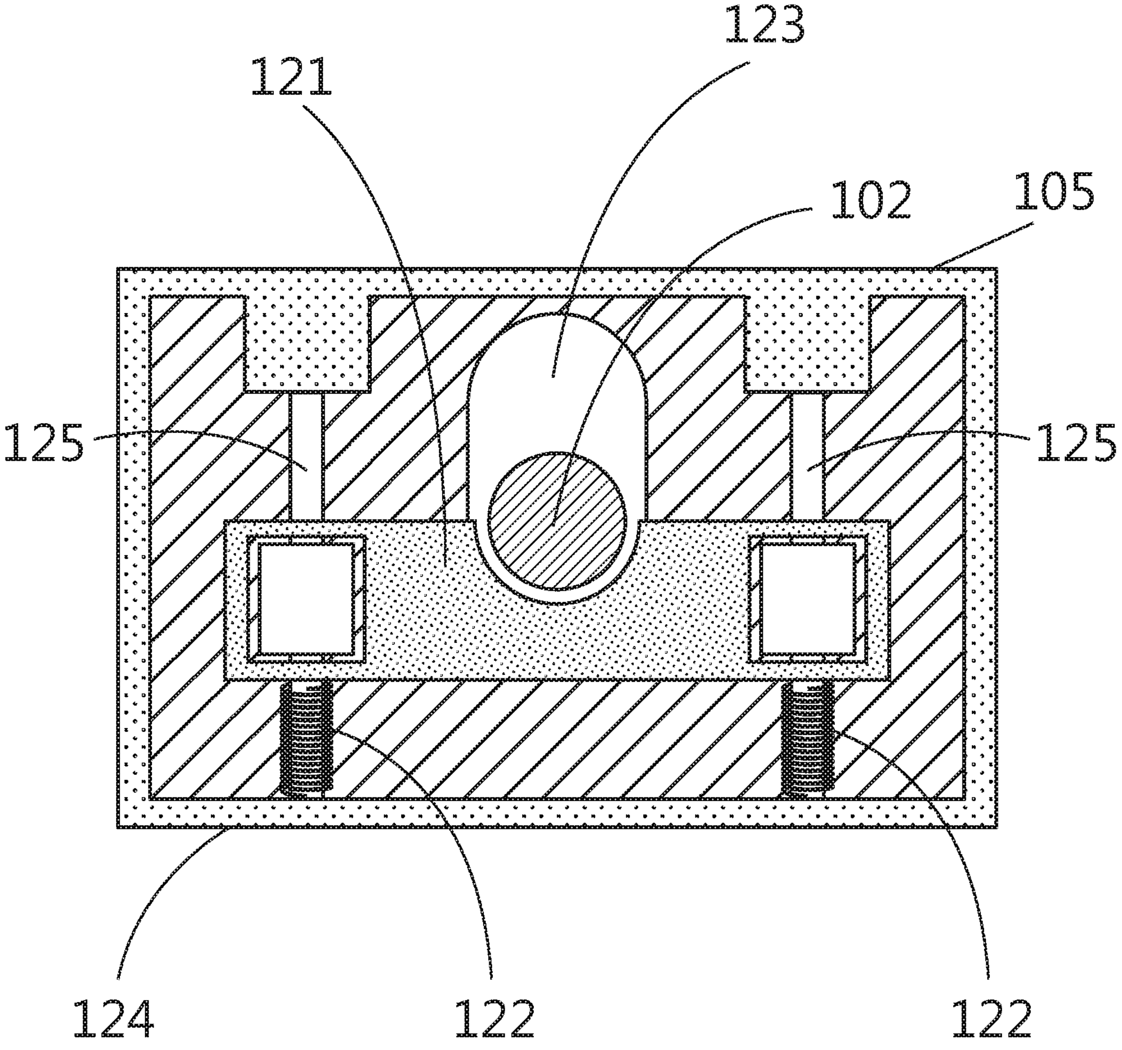
FIG. 4 is a sectional top view of the shock absorber of FIG. 3 with the elastic component in a compressed state according to one embodiment of the present disclosure.

FIGS. 3 and 4 show an embodiment of the shock absorber 105. The shock absorber 105 may include a housing 124, at least one slide rod 125, a sliding block 121, and an elastic component 122. The housing 124 may have a bottom wall formed with a slot 123. The upper end of the sorter 102 can be inserted into the housing 124 through the slot 123. The at least one slide rod 125 may be fixed within the housing 124, and a sliding block 121 may be slidable along the at least one slide rod 125. An elastic component 122 may be mounted at one end of the at least one slide rod 125 which is extending towards one of the sidewalls 1001, and exerting a biasing force to urge the sliding block 121 to another end of the at least one slide rod 125 which is extending away from the one of the sidewalls 1001. If a lateral force is exerted on the sorter 102 by the objects 114, 115, 116, 117, as shown in FIG. 2, the sorter 102 tilts sideways towards one of the sidewalls 1001, and the upper end of the sorter 102 moves along the slot 123 and presses the sliding block 121 against the biasing force of the elastic component 122, thereby absorbing the lateral force of the objects 114, 115, 116, 117. After the lateral force of the objects 114, 115, 116, 117 is released, the elastic component 122 rebounds and pushes the sliding block 121 back, and the tilted sorter 102 returns to its original position. The elastic component 122 may be in the form of a coil spring that is wound around the slide rod 125 or a rubber band, which is compressible and stretchable. The distance of the upper end of the sorter 102 moved along the slot 123 is proportional to the force applied to the sorter 102. The more the force applied to the sorter 102, the closer the upper end of the sorter 102 is to the sidewall.

In one embodiment, the lower end of the sorter 102 may be rotatably coupled to and driven by the drive unit 103 through the output shaft 118. The output shaft 118 may extend upward from another end of the drive unit 103. A lower end of the output shaft 118 may be rotatably coupled to and driven by the drive unit 103. The lower end of the sorter 102 may be connected coaxially to an upper end of the output shaft 118.

The frame 100 may include a first sliding member 120 slanting downward from another one of the sidewalls 1001 to the lower portion of the sorter 102 to facilitate rolling or sliding of the objects 109 towards the lower portion of the sorter 102.

The divider 108 may be attached to a lower end of the first sliding member 120 to prevent undesirable dispensing of objects 109. The divider 108 may be located proximate to the lower portion of the sorter 102 in such a position that the divider 108 can allow one of the objects 109 to pass through.

The frame 100 may further include a second sliding member 119 disposed below the first sliding member 120. The second sliding member 119 may be slanting downward from the lower portion of the sorter 102 to a pick-up port 107 located on one of the sidewalls 1001. In the illustrated embodiment, the pick-up port 107 is provided on one of the sidewalls 1001 located at a front side of the frame 100 to facilitate picking up of the objects 109.

It is understood by a person skilled in the art that the drive unit 103 of the present disclosure includes mechanical and electrical components, such as a motor 1031 and gears to drive the sorter 102 and a circuitry (not shown) electrically connected to the motor 1031 and a sensor module 106 in order to control the rotation of the sorter 102. The motor 1031 can turn clockwise or anticlockwise. When the drive unit 103 is activated, the drive unit 103 drives the sorter 102 to spin clockwise or anticlockwise about its axis. The spinning action of the sorter 102 and the force of gravity can generate multidirectional forces to move and rearrange the stacked objects 109 in the cavity 101, and at the same time carry the objects 109 down to the lower portion of the sorter 102 under gravity. The drive unit 103 can be stopped after a bottommost one of the objects 109 is dispensed.

As illustrated in FIG. 1, the multidirectional forces may include upward forces indicated by a directional arrow 111 and downward forces indicated by a direction arrow 112. The upward forces 111 can push away the objects 109 in an upper portion of the cavity 101 to release pressure exerting on the objects 109 in a lower portion of the cavity 101, while at the same time the downward forces 112 can make the objects 109 fit into the lower helical slot 1025, and carry the objects 109 down to the lower portion of the sorter 102, until a bottommost one of the objects 109 passes through the divider 108 and rolls or slides on the second sliding member 119 towards the pick-up port 107. The divider 108 can block the rest of the objects 109 and ensure that only one object is dispensed at one time.

The automated sortation and dispensing system 1000 in the present application may further include one or more sensor modules 106 mounted on the frame 100 proximate to the pick-up port 107 and in the vicinity of or on the second sliding member 119 for detecting the bottommost one of the objects 109 that passes through the second sliding member 119, and then the drive unit 103 can be stopped. The one or more sensor modules 106 include one or more sensors, which may include an infrared sensor, an ultrasonic sensor, a proximity sensor, a computer vision sensor, an optical sensor, a weight sensor, a limit switch sensor, or any other suitable sensors. For example, infrared sensors may be mounted above the second sliding member 119, and a weight sensor may be provided on the second sliding member 119. In the illustrated embodiment, the sensor module 106 may be embedded in a compartment located above the pick-up port 107.

Referring to FIG. 2, there is shown a formation of an arc by the stacked objects 114, 115, 116, 117 at the lower portion. This causes jamming and the objects cannot be dispensed. The causes of arc formation may include but are not limited to the weight of the objects, angle of the sidewalls, and friction. To prevent jamming, the action of spinning of the sorter 102 can create multidirectional forces to rearrange the objects 109, and hence reduce the pressure exerting on the stacked objects 109.

With reference to FIG. 2, there is shown a directional arrow 110 representing a lateral force exerted on the sorter 102 by the stacked objects 109. If the lateral force is exerted on the sorter 102 by the objects 114, 115, 116, 117, the drive unit 103 can pivot downward about the lever axis defined by the transverse rod 104, and the sorter 102 can tilt sideways away from the stacked objects 109 and toward one of the sidewalls 1001, thereby releasing the pressure exerted on the objects 109, and preventing the objects 109 from being jammed so that the spinning of the sorter 102 will not be stopped. The sorter 102 returns to its original position by a rebound force of the shock absorber 105.

The sorter 102 can combine with the drive unit 103, the transverse rod 104, the output shaft 118, and the shock absorber 105 to form a suspension damper system to reduce jolting and reset the position of the sorter 102. Without the suspension damper system, the sorter 102 may stop spinning when too much weight of the stacked objects 109 is exerting on the sorter 102.

The automated sortation and dispensing system 1000 of the present application can support stacking of a variety of objects of different sizes and shapes in bulk, and maximize the amount of storage space utilized. The shapes of objects may include but are not limited to a circular shape, a toy capsule shape, a box shape, a cylindrical shape, and an irregular shape. The dimensions of the various parts of the system are scalable to fit different requirements such as capacity, size of the objects, weight of the objects, and installation space.

The automated sortation and dispensing system can prevent jamming and increase the success rate of dispensing objects.

Furthermore, the automated sortation and dispensing system is advantageous in that it can be used in applications such as, but is not limited to, distribution of goods, promotions, lucky draws, and self-service pickup.

It will be appreciated by persons skilled in the art that numerous variations and/or modifications may be made to the present disclosure as shown in the specific embodiments without departing from the scope of protection as broadly described. The present embodiments are, therefore, to be considered in all respects as illustrative and not restrictive.

Any reference to prior art contained herein is not to be taken as an admission that the information is common general knowledge, unless otherwise indicated.

What is claimed is:

1. An automated sortation and dispensing system (1000), comprising:

a frame (100) including a top wall, a bottom wall, and sidewalls (1001) that collectively define a cavity (101) in which objects (109) are stacked, characterized in that the system (1000) comprises:

a lever axis defined by a transverse rod (104) which is attached to the frame (100) in a lower portion of the cavity (101);

a drive unit (103) having one end pivotally coupled to the transverse rod (104), and acting as a lever arm;

a sorter (102) comprising a shaft (1021) extending upward from another end of the drive unit (103) to an upper portion of the cavity (101), an upper helical slot (1022) extending along an upper portion and a middle portion of the shaft (1021) and defined by one of a left-hand screw (1023) and a right-hand screw (1024), and a lower helical slot (1025) extending along a lower portion of the shaft (1021) and defined by another one of the left-hand screw (1023) and the right-hand screw (1024), a lower end of the sorter (102) rotatably coupled to and driven by the drive unit (103); and a shock absorber (105) being fixed to the frame (100) at the upper portion of the cavity (101), an upper end of the sorter (102) being engageable with the shock absorber (105);

a first sliding member (120) slanting downward from one of the sidewalls (1001) to the lower portion of the sorter (102);

a divider (108) connected to a lower end of the first sliding member (120), and located proximate to the lower portion of the sorter (102) in such a position that the divider (108) allows one of the objects (109) to pass through;

a second sliding member (119) disposed below the first sliding member (120), and slanting downward from the lower portion of the sorter (102) to a pick-up port (107); and one or more sensor modules (106) mounted on the frame (100) proximate to the pick-up port (107) and in the vicinity of or on the second sliding member (119) for detecting a bottommost one of the objects (109) that passes through the second sliding member (119), when the drive unit (103) is activated, the drive unit (103) drives the sorter (102) to spin clockwise or anticlockwise about its axis and generate multidirectional forces to rearrange the objects (109), and at the same time carry the objects (109) down to the lower portion of the sorter (102) under gravity, the drive unit (103) is stopped after the bottommost one of the objects (109) is dispensed, and if a lateral force is exerted on the sorter (102) by the objects (114, 115, 116, 117), the drive unit (103) pivots downward about the lever axis, and the sorter (102) tilts sideways to absorb the lateral force by means of the shock absorber (105) and returns to its original position by a rebound force of the shock absorber (105) after the lateral force is released.

2. An automated sortation and dispensing system (1000), comprising:

a frame (100) including a top wall, a bottom wall, and sidewalls (1001) that collectively define a cavity (101) in which objects (109) are stacked, characterized in that the system (1000) comprises:

a lever axis defined by a transverse rod (104) which is attached to the frame (100) in a lower portion of the cavity (101);

a drive unit (103) having one end pivotally coupled to the transverse rod (104), and acting as a lever arm;

a sorter (102) comprising a shaft (1021) extending upward from another end of the drive unit (103) to an upper portion of the cavity (101), an upper helical slot (1022) extending along an upper portion and a middle portion of the shaft (1021) and defined by one of a left-hand screw (1023) and a right-hand screw (1024), and a lower helical slot (1025) extending along a lower portion of the shaft (1021) and defined by another one of the left-hand screw (1023) and the right-hand screw (1024), a lower end of the sorter (102) rotatably coupled to and driven by the drive unit (103); and a shock absorber (105) fixed to the frame (100) at the upper portion of the cavity (101), an upper end of the sorter (102) being engageable with the shock absorber (105), when the drive unit (103) is activated, the drive unit (103) drives the sorter (102) to spin clockwise or anticlockwise about its axis and generate multidirectional forces to rearrange the objects (109), and at the same time carry the objects (109) down to the lower portion of the sorter (102) under gravity, the drive unit (103) is stopped after a bottommost one of the objects (109) is dispensed, and if a lateral force is exerted on the sorter (102) by the objects (114, 115, 116, 117), the drive unit (103) pivots downward about the lever axis, and the sorter (102) tilts sideways towards one of the sidewalls (1001) to absorb the lateral force by means of the shock absorber (105) and returns to its original position by a rebound force of the shock absorber (105) after the lateral force is released.

3. The automated sortation and dispensing system (1000) according to claim 2, characterized in that the frame (100) comprises a first sliding member (120) slanting downward from another one of the sidewalls (1001) to the lower portion of the sorter (102) to facilitate rolling or sliding of the objects (109) towards the lower portion of the sorter (102).

4. The automated sortation and dispensing system (1000) according to claim 3, characterized in that a divider (108) is connected to a lower end of the first sliding member (120), and located proximate to the lower portion of the sorter (102) in such a position that the divider (108) allows one of the objects (109) to pass through.

5. The automated sortation and dispensing system (1000) according to claim 4, characterized in that the frame (100) further comprises a second sliding member (119) disposed below the first sliding member (120), and slanting downward from the lower portion of the sorter (102) to a pick-up port (107) provided on the sidewalls (1001).

6. The automated sortation and dispensing system (1000) according to claim 5, characterized in that the system (1000) further comprises one or more sensor modules (106) mounted on the frame (100) proximate to the pick-up port (107) and in the vicinity of or on the second sliding member (119) for detecting the bottommost one of the objects (109) that passes through the second sliding member (119).

7. The automated sortation and dispensing system (1000) according to claim 2, characterized in that the multidirectional forces include upward forces (111) that push away the objects (109) in the upper portion of the cavity (101) to release pressure exerting on the objects (109) in the lower portion of the cavity (101), and downward forces (112) that make the objects (109) fit into the lower helical slot (1025).

8. The automated sortation and dispensing system (1000) according to claim 2, characterized in that the shock absorber (105) is attached on an inner surface of the one of the sidewalls (1001).

9. The automated sortation and dispensing system (1000) according to claim 2, characterized in that the lower end of the sorter (102) is rotatably coupled to and driven by the drive unit (103) through an output shaft (118).

10. The automated sortation and dispensing system (1000) according to claim 9, characterized in that an upper end of the output shaft (118) is connected coaxially to the lower end of the sorter (102), and a lower end of the output shaft (118) is rotatably coupled to and driven by the drive unit (103).

11. The automated sortation and dispensing system (1000) according to claim 10, characterized in that the sorter (102) combines with the drive unit (103), the transverse rod (104), the output shaft (118), and the shock absorber (105) to form a suspension damper system to absorb the lateral force and reset position of the sorter (102).

12. The automated sortation and dispensing system (1000) according to claim 2, characterized in that the one of the sidewalls (1001) is located at a rear side of the frame (100).

13. The automated sortation and dispensing system (1000) according to claim 5, characterized in that the pick-up port (107) is provided on one of the sidewalls located at a front side of the frame (100) to facilitate picking up of the objects (109).

14. The automated sortation and dispensing system (1000) according to claim 6, characterized in that the one or more sensor modules (106) comprise one or more sensors selected from a group consisting of an infrared sensor, an ultrasonic sensor, a proximity sensor, a computer vision sensor, an optical sensor, a weight sensor, and a limit switch sensor.

15. The automated sortation and dispensing system (1000) according to claim 2, characterized in that the objects (109) have a shape selected from a group consisting of a circular shape, a toy capsule shape, a box shape, a cylindrical shape, and an irregular shape.

16. The automated sortation and dispensing system (1000) according to claim 2, characterized in that the drive unit (103) comprises a motor (1031) that drives the sorter (102) to spin clockwise or anticlockwise about its axis.

17. The automated sortation and dispensing system (1000) according to claim 2, characterized in that the sorter (102) is in the form of a vertical screw conveyor.

18. The automated sortation and dispensing system (1000) according to claim 2, characterized in that the shock absorber (105) comprises:

a housing (124) having a bottom wall formed with a slot (123), the upper end of the sorter (102) being inserted into the housing (124) through the slot (123);

at least one slide rod (125) fixed within the housing (124);

a sliding block (121) slidable along the at least one slide rod (125); and an elastic component (122) mounted at one end of the at least one slide rod (125) which is extending towards the one of the sidewalls (1001), and exerting a biasing force to urge the sliding block (121) to another end of the at least one slide rod (125) which is extending away from the one of the sidewalls (1001), if the lateral force is exerted on the sorter (102) by the objects (114, 115, 116, 117), the sorter (102) tilts sideways towards the one of the sidewalls (1001), the upper end of the sorter (102) moves along the slot (123) and presses the sliding block (121) against the biasing force of the elastic component (122), thereby absorbing the lateral force of the objects (114, 115, 116, 117), and after the lateral force of the objects (114, 115, 116, 117) is released, the elastic component (122) rebounds and pushes the sliding block (121) back, and the tilted sorter (102) returns to its original position.

19. The automated sortation and dispensing system (1000) according to claim 18, characterized in that the elastic component (122) is a coil spring wound around the or each of the at least one slide rod (125).

20. The automated sortation and dispensing system (1000) according to claim 2, characterized in that the upper helical slot (1022) extending along the upper and middle portions of the shaft (1021) is defined by the left-hand screw (1023), the lower helical slot (1025) extending along the lower portion of the shaft (1021) is defined by the right-hand screw (1024), and the drive unit (103) drives the sorter (102) to spin anticlockwise about its axis.

* * * * *